United States Patent [19]

Sone et al.

[11] Patent Number: 4,783,702
[45] Date of Patent: Nov. 8, 1988

[54] METHOD OF THROWING AWAY UNNECESSARY SIGNAL CHARGES IN SOLID STATE IMAGE SENSING DEVICE

[75] Inventors: Yoshiaki Sone, Settsu; Takao Kuroda, Ibaraki, both of Japan

[73] Assignee: Matsushita Electronics Corporation, Kadoma, Japan

[21] Appl. No.: 921,493

[22] Filed: Oct. 22, 1986

[30] Foreign Application Priority Data
Oct. 22, 1985 [JP] Japan ................... 60-236062

[51] Int. Cl.$^4$ ............................................. H04N 3/14
[52] U.S. Cl. ........................ 358/213.19; 358/213.26
[58] Field of Search ............... 358/213.15, 213.18, 358/213.19, 213.23, 213.25, 213.26

[56] References Cited

U.S. PATENT DOCUMENTS

| | | | |
|---|---|---|---|
| 3,931,463 | 1/1976 | Levine | 358/213.19 |
| 4,322,753 | 3/1982 | Ishihara | 358/213.19 |
| 4,584,609 | 4/1986 | Klein et al. | 358/213.19 |
| 4,651,215 | 3/1987 | Bell et al. | 358/213.25 |

Primary Examiner—Jin F. Ng
Assistant Examiner—Stephen Brinich
Attorney, Agent, or Firm—Cushman, Darby & Cushman

[57] ABSTRACT

A solid state image sensing device which transfers unnecessary signal charges accumulated at photoelectric conversion devices by a first charge pulse in a vertical blanking period to vertical transferring means and throws out the unnecessary signal charges using throwaway means. The necessary signal charges accumulated in the photoelectric conversion devices in such period after the first charge pulse are transferred by a second charge pulse to the vertical transferring means, a horizontal transferring means and a signal detecting means, thereby to issue a video signal.

8 Claims, 6 Drawing Sheets

METHOD OF THROWING AWAY UNNECESSARY SIGNAL CHARGES IN SOLID STATE IMAGE SENSING DEVICE

FIELD OF THE INVENTION AND RELATED ART STATEMENT

1. Field of the Invention

The present invention is related to an image sensing device and a method for driving the same, and more particularly to a solid state sensing device and a method for throwing away unnecessary signal charge accumulated therein.

2. Description of the Related Art

Recently, such functions as still picture mode, frame sending mode (speedy picture search) and picture slow reproducing mode have been used in video tape recorders. However, the period of the video signal corresponding to one field in the video tape recorder is 1/60 sec for an NTSC type television signal and 1/50 sec for a PAL or SECAM type television signal. The NTSC type and the PAL type are described in Green Book Report 624, "Charateristics of Television Systems", 1978, C.C.I.R. (International Radio Communication Conference). Since the time 1/60 sec or 1/50 sec corresponds to a shutter speed of 1/60 or 1/50 sec for a silver salt photography type camera, which is considerably, a blur in the image is caused in the still picture mode, etc., for a speedily moving object.

OBJECT AND SUMMARY OF THE INVENTION

The present invention is directed to a solid state image sensing device and method for driving the device wherein the effective period of the photoelectric conversion for a video signal corresponding to one field is shorter than the 1/60 sec of the conventional device, in order to overcome the disadvantages of the conventional device and method.

The present invention represents a solid state image sensing device and method for driving the device wherein the effective period of the photoelectric conversion for a video signal corresponding to one field can be made shorter than 1/60 sec (NTSC type) or 1/50 sec (PAL type) of the conventional device, thereby overcoming the disadvantages of the conventional device and method.

The solid state image sensing device of the present invention comprises:

plural photoelectric conversion devices for converting light energy into electric energy, the devices being disposed in a matrix pattern, plural vertical transferring means disposed beside and connected to the plural photoelectric conversion devices, respectively, to receive both necessary signal charges and unnecessary signal charges which are accumulated in the plural photoelectric conversion devices, horizontal transferring means connected to the vertical transferring means to receive at least the necessary signal charges from the plural vertical transferring means, signal detecting means connected to the horizontal transferring means to receive at least the necessary signal charges from the horizontal transferring means and to issue video signals, and signal charge throw-away means for throwing away the unnecessary signal charges provided in the solid state image sensing device.

The present invention also comprises a method for driving the solid state image sensing device of the present invention, comprising the steps of:

photoelectrically converting light energy to signal charges of electrical energy by plural photoelectric conversion devices disposed in a matrix pattern, transferring signal charges accumulated in the photoelectric conversion devices to respective plural vertical transferring means disposed beside the photoelectric conversion devices, transferring the signal charges to horizontal transferring means from the plural vertical transferring means, transferring the signal charges from the horizontal transferring means to signal detecting means, detecting the signal charges transferred from the horizontal transferring means and issuing video signals by the signal detecting means, transferring unnecessary signal charges among the signal charges to the vertical transferring means based on reception of a first charge pulse in a vertical blanking period, transferring the unnecessary signal charges to throw-away means disposed at a side opposite to the horizontal transferring means with regard to the vertical transferring means, from the vertical transferring means, throwing away the unnecessary signal charges by the throw-away means, transferring, based on a second charge pulse, necessary signal charges which are accumulated in the photoelectric conversion devices in such period between the first charge pulse and the second charge pulse to the vertical transferring means, and further transferring the necessary signal charges through the vertical transferring means and the horizontal transferring means to the signal detecting means.

While the novel features of the invention are set forth with particularity in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 2 is a timings chart showing timing of signals in the first embodiment of FIG. 1, wherein

FIG. 4 is a timings chart showing timing of signals in the second embodiment of FIG. 3, wherein

FIG. 6 is a timing chart showing timings of signals in the third embodiment of FIG. 5, wherein

DESCRIPTION OF THE PREFERRED EMBODIMENTS

The present invention is described as follows based on an NTSC type television signal, but the present invention is also suitable for a PAL or SECAM type television signal as well.

The present invention is based on the concept that the blur of an image of a video camera using a solid state image sensing device can be prevented by decreasing the photoelectric conversion period, which effectively corresponds to the control of the shutter speed of the silver salt photography type camera with respect to blurring so that it is shorter than the conventional 1/60 sec. Hereinafter such representation as "electronic shutter" is used for representing the above-mentioned electronic controlling.

A first embodiment of the solid state image sensing device and the method for driving the device of the present invention is described as follows referring to the figures.

Figure 1:
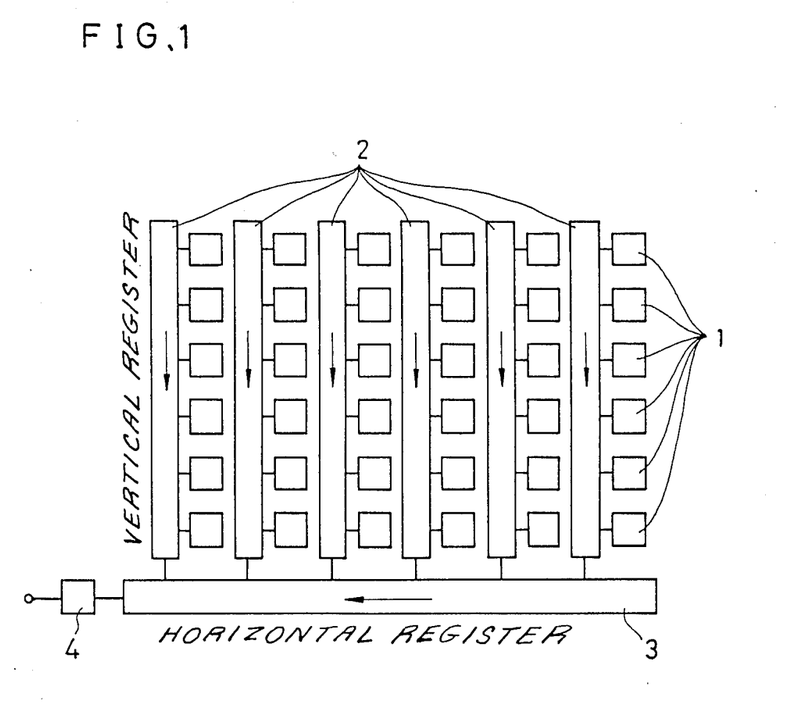
FIG. 1 is a plane view showing a first embodiment of a solid state image sensing device of the present invention.

The fundamental constitution of the solid state image sensing device of the first embodiment comprises photoelectric conversion devices 1, vertical transferring means 2 connected to the photoelectric conversion devices 1, a horizontal transferring means 3 connected to the vertical transferring means 2, and signal detecting means 4 connected to the horizontal transferring means 3. The arrow marks represent the direction of normal transferring of signal charges.

FIG. 2 is a timing chart showing typical driving pulses and output signals of the solid state image sensing device of FIG. 1 when the electronic shutter operates. FIG. 2(a) shows a composite blanking signal, whereas FIG. 2(b) shows transferring pulses (hereinafter abbreviated as charge pulses) for transferring signal charges of the photoelectric conversion device 1 to the vertical transferring means 2. FIG. 2(c) shows transferring pulses (hereinafter abbreviated as vertical transferring pulses) for transferring signal charges of the vertical transferring means 2 to the horizontal transferring means 3, and FIG. 2(d) shows transferring pulses (hereinafter abbreviated as horizontal transferring pulses and illustrated in a manner such that the illustrated pulse number is less than the real pulse number since the horizontal transferring pulses are extremely high frequency pulses) for transferring signal charges of the horizontal transferring means 3 to the signal detecting means 4. Finally, FIG. 2(e) shows the output signal from the signal detecting means 4.

During a vertical blanking period, signals which are charged at a photoelectric conversion device 1 in a period 14 and are not to be used for video signals (hereinafter abbreviated as unnecessary signal charge) are transferred to the vertical transferring means 2 by a first charge pulse 11. Then, the vertical transferring means 2 transfers the unnecessary signal charges in the vertical transferring means 2 to the horizontal transferring means 3 within a period 13. Therefore, the vertical transferring pulses in a period 15 for transferring the unnecessary signal charges can be generated at a higher speed than normal speed. Then, the transferred unnecessary signal charges in the horizontal transferring means 3 are issued by the horizontal transferring means 3 through the signal detecting means 4.

Then, signal charges which are charged at the photoelectric conversion device 1 in a period 13 after the first charge pulse 11 and which are to be used for the video signal are transferred to the vertical transferring means 2 by a second charge pulse 12. Until the next charge pulse 11 for the above transferring, namely, during the period 14, signal charges for 1 horizontal line are sequentially transferred to the horizontal transferring means 3 from the vertical transferring means 2 by the vertical transferring pulse in every 1 horizontal period as in the conventional case which does not use the electronic shutter. Then, video signals are issued in series from the horizontal transferring means 3 by the horozontal transferring pulse through the signal detecting means 4.

As a result, the signals issued from the solid state image sensing device during the vertical scanning period are only the signal charges which are photoelectrically-converted in the period 13 of FIG. 2. That is, the period 13 is 1/10 to 1/20 in comparison with one field period (1/60 sec). This period thus corresponds to 1/600 to 1/1200 sec shutter speed of the silver salt photography type camera. Thus, by using the electronic shutter in this manner, the blur of the image of the moving object can be reduced in the still picture mode, the frame sending mode and the slow picture mode in VTR reproducing.

Further, a second embodiment of the present invention is described as follows.

Figures 2A, 2B:
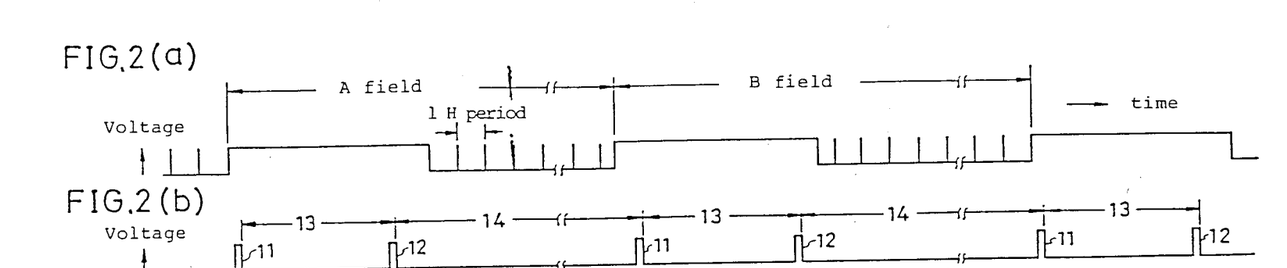
FIG. 2(a) is a composite blanking signal.
FIG. 2(b) is a transferring signal for transferring signal charge photoelectrically converted in plural photoelectric conversion devices to vertical transferring means.
Figure 2C:
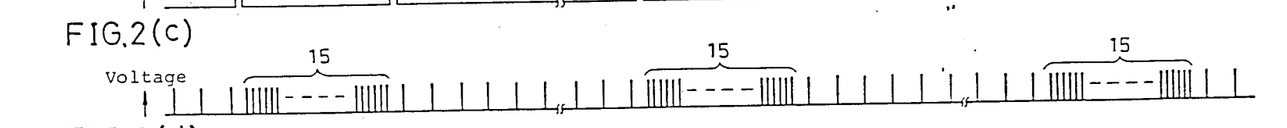
FIG. 2(c) is a vertical transferring signal.
Figure 2D:
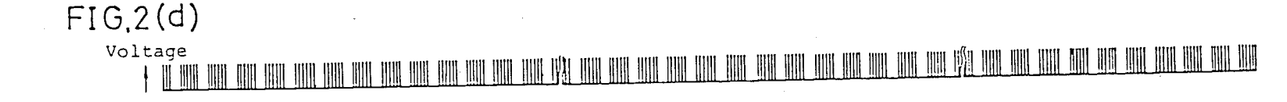
FIG. 2(d) is a horizontal transferring signal.
Figure 2E:
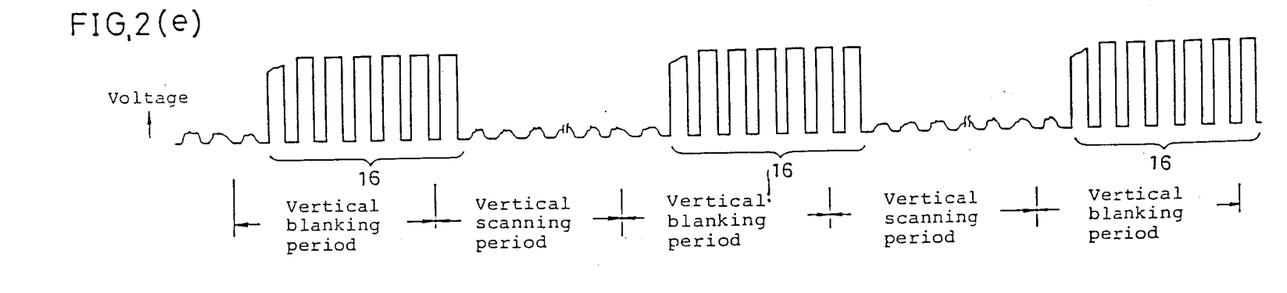
FIG. 2(e) is an output signal.

The second embodiment intends to resolve the disadvantages mentioned below of the first embodiment. That is, the unnecessary signal charges which are photoelectrically-converted in the period 14 are transferred to the vertical transferring means 2 at the reception of the first charge pulse 11, and are transferred to the horizontal transferring means 3 at the reception of the high-speed vertical transferring pulses, before being further transferred to the signal detecting means 4 and thereby issued as shown in FIG. 2(e). Therefore, in a period 16 when the unnecessary signal charges are issued (FIG. 2(e)) from the signal detecting means 4, the signal charges which have been charged at the photoelectric conversion device 1 in the period 14 are concentratively issued. That is, in the conventional image sensing device, the signal charges charged at the photoelectric conversion device 1 in the period 14 are transferred to the horizontal transferring means 3 in the next vertical scanning period together with the signal charges charged at the photoelectric conversion device 1 in the period 13.

In the present invention, on the other hand, the signal charges charged at the photoelectric conversion device 1 in the period 14 are concentratively transferred to the horizontal transferring means 3 by the electronic shutter in the next period 15. That is, contrary to conventional transferring of the signal charges which are transferred to the horizontal transferring means 3 in about 250 horizontal periods in the conventional device, the transferring to the horizontal transferring means 3 of the first embodiment of the present device is made within only several horizontal periods. Therefore, the amount of the signal charges is likely to exceed a limit of signal charge amount which can be dealt with by the horizontal transferring means 3 and the signal detecting means 4. Thus, in a period 16 (FIG. 2(e)), not only a signal voltage thirty times as high as the normal signal voltage is produced, but also, such signal charges which cannot be dealt with by the horizontal transferring means 3 and the signal detecting means 4 remain. Also, the period 16 in which the unnecessary signal charges are issued is liable to extend to the vertical scanning period after lapse of the vertical blanking period. As a result, a white part sometimes appears in the upper part of the video monitor screen. The below-mentioned second embodiment is designed to eliminate the above-mentioned problem.

The second embodiment is described as follows.

Figure 3:
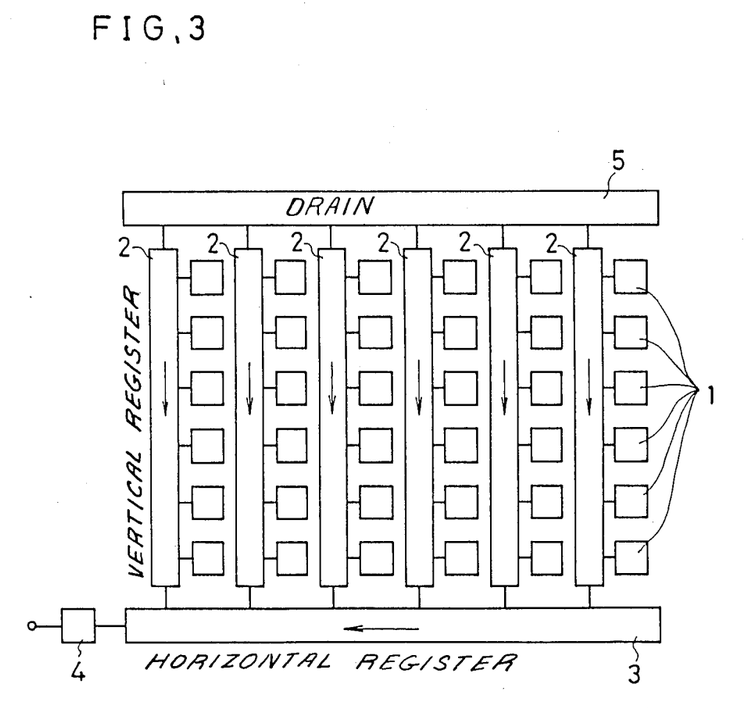
FIG. 3 is a plane view showing a second embodiment of the solid state image sensing device of the present invention.
Figure 4A:
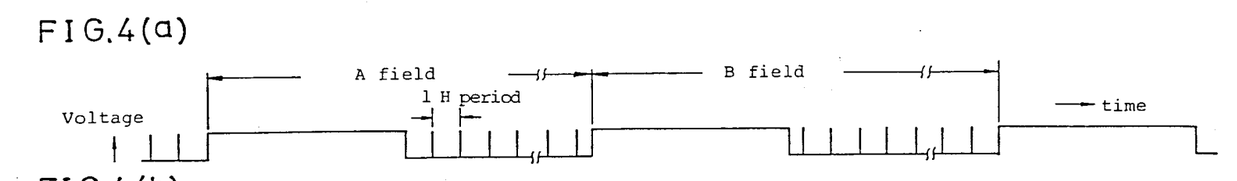
FIG. 4(a) is a composite blanking signal.
Figure 4B:
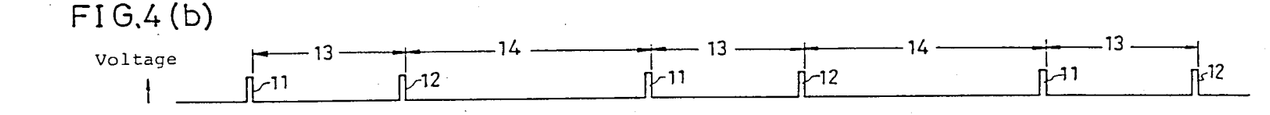
FIG. 4(b) is a transferring signal for transferring signal charge photoelectrically converted in plural photoelectric conversion devices to vertical transferring means.
Figure 4C:
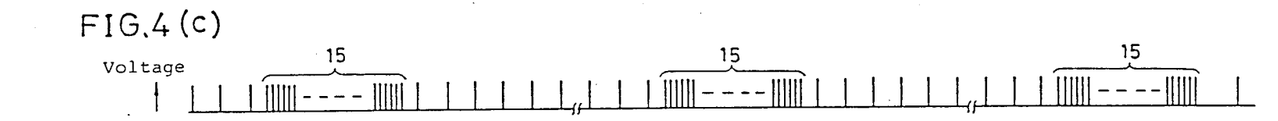
FIG. 4(c) is a vertical transferring signal.
Figure 4D:
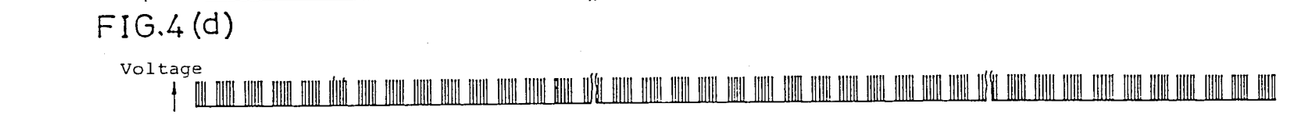
FIG. 4(d) is a horizontal transferring signal.
Figure 4E:
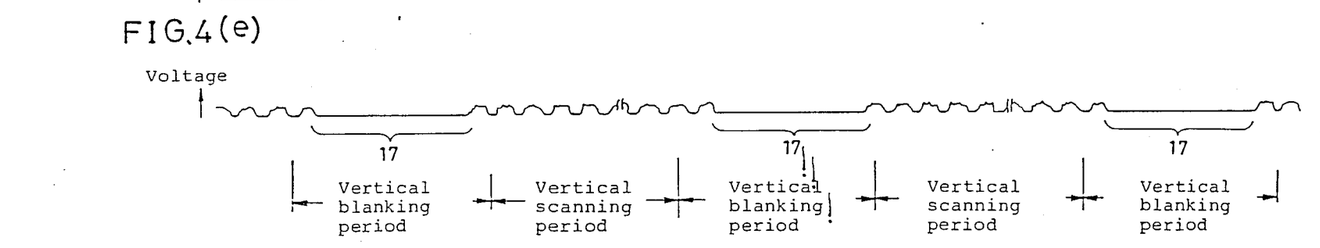
FIG. 4(e) is an output signal.

FIG. 3 shows the constitution of the solid state image sensing device of the second embodiment of the present invention. The parts 1 to 4 in FIG. 3 correspond to the parts 1-4 in FIG. 1, respectively. However, throw-away means 5 is connected to an end part opposite the horizontal transferring means side of the vertical transferring part 2. The arrow indications represent the transferring direction of the normal signal charges (necessary signal charges). An interline transfer CCD having 420 (horizontal)×490 (vertical) elements is used as the solid state image sensing device.

The operation is described as follows.

FIG. 4 shows the driving pulses and the output signals in the second embodiment. FIG. 4(a) shows the composite blanking signal, and FIG. 4(b) shows the charge pulses. FIG. 4(c) shows the vertical transferring pulses, and FIG. 4(d) shows the horizontal transferring pulses (the illustrated pulse numbers are illustrated as in FIG. 2). Finally, FIG. 4(e) shows the output signal from the solid state image sensing device of FIG. 3.

In the vertical blanking period, the unnecessary signal charges which have been accumulated in the period 14 are transferred to the vertical transferring means 2 by the first charge pulse 11. Then, in the period 13, the vertical transferring means 2 is driven in a direction contrary to the illustrated arrow direction of FIG. 3 at the issuance of pulses for inverse direction, and thereby all signal charges in the vertical transferring means 2 are transferred to the throw-away means 5. The transferred signal charges are thrown away in the throw-away means 5. The throw-away means 5 comprises, for example, an FET and an electric source.

Then, the signal charges charged in the photoelectric conversion device 1 in the period 13 after the first charge pulse 11 are transferred to the vertical transferring means 2 at issuance of a second charge pulse 12. Until the next first charge pulse 11 after the second charge pulse 12, namely, in the vertical scanning period, signal charges for 1 horizontal line are sequentially transferred to the horizontal transferring means 3 from the vertical transferring means 2 at issuance of the vertical transferring pulses in every 1 horizontal period, as in the conventional case not using the electronic shutter. Then, the signal charges are transferred to the signal detecting means 4 by the horizontal transferring pulses and are issued. As a result, in a period 17 of FIG. 4(e), the unnecessary signal is not issued from the signal detecting means 4.

Figure 5:
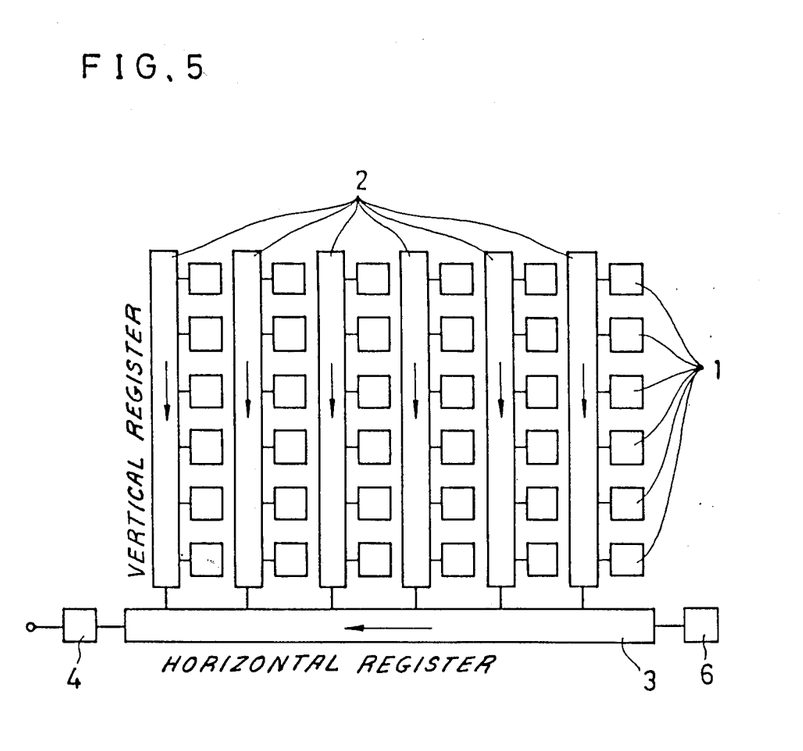
FIG. 5 is a plane view showing a third embodiment of the solid state image sensing device of the present invention.
Figure 6A:
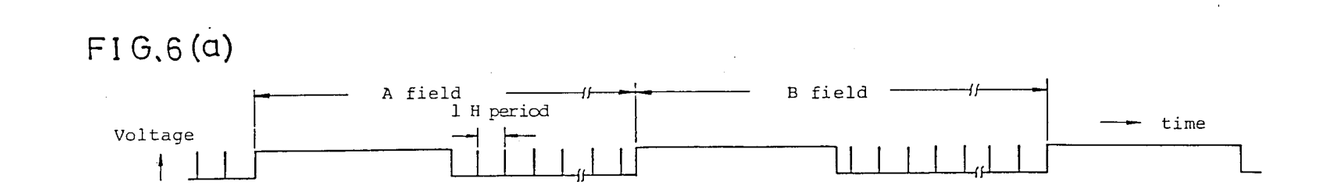
FIG. 6(a) is a composite blanking signal.
Figure 6B:
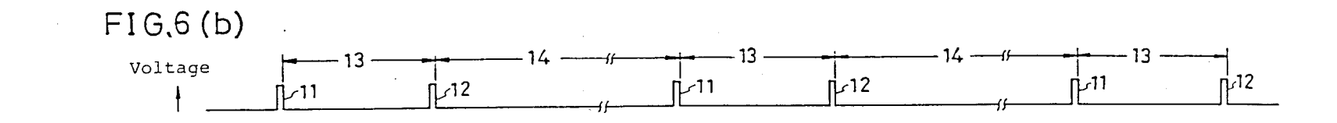
FIG. 6(b) is a transferring signal for transferring signal charge photoelectrically converted in plural photoelectric conversion devices to vertical transferring means.
Figure 6C:
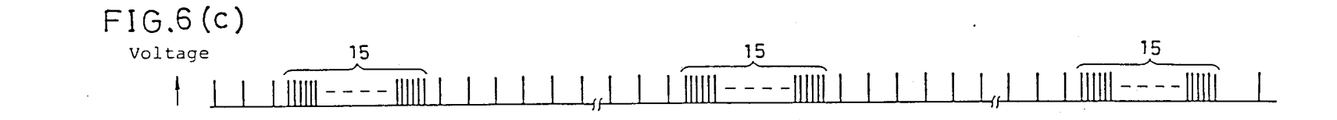
FIGS. 6(c) is a vertical transferring signal.
Figure 6D:
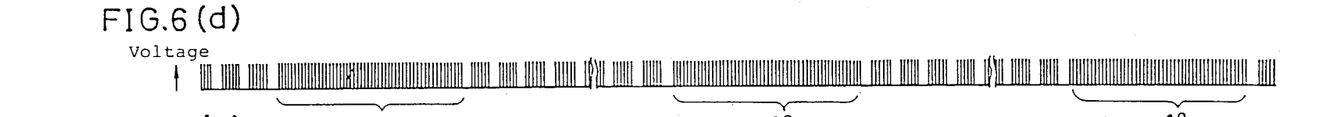
FIG. 6(d) is a horizontal transferring signal.
Figure 6E:
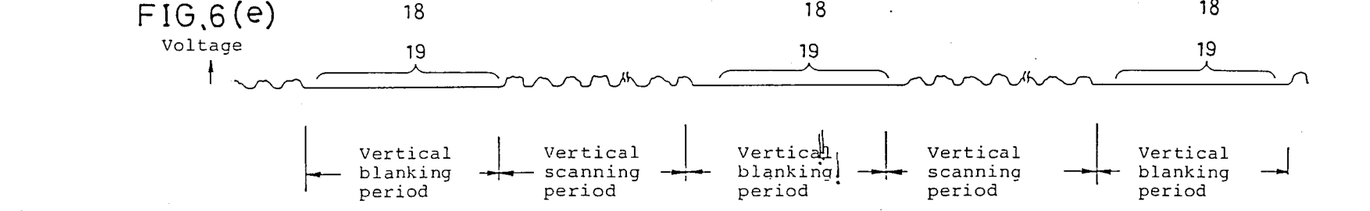
FIG. 6(e) is an output signal.

FIG. 5 is a third embodiment of the present invention.

The parts 1 to 4 in FIG. 5 correspond to the parts 1 to 4 in FIG. 1, respectively. However throw-away means 6 is connected to an end part, opposite the signal detecting means side, of the horizontal transferring means 3. The arrow indications represent a normal transferring direction of the signal charges. An interline transfer CCD having 420 (horizontal)×490 (vertical) elements is used as the solid state image sensing device.

The operation of the solid state image sensing device of the third embodiment is described as follows.

Fig. 6 shows the driving pulses and the outputs. FIG. 6(a) shows the composite blanking signal, and FIG. 6(b) shows the charge pulses. FIG. 6(c) shows the vertical transferring pulses, and FIG. 6(d) shows the horizontal transferring pulses (the illustrated pulse number is illustrated as in FIG. 4). Finally, FIG. 6(e) shows the signal output from the solid state image sensing device.

In the vertical blanking period, the unnecessary signal charges charged till then at the photoelectric conversion device 1 in the period 14 are transferred at issuance of the first charge pulse 11 to the vertical transferring means 2. Then, all signal charges in the vertical transferring means 2 are transferred to the horizontal transferring means 3 in the period 13. At this time, the signal charges are transferred to the throw-away means 6 in a contrary direction (namely, an inverse direction to the illustrated arrow in FIG. 5) to the signal detecting means side by the horizontal transferring means 3 at issuance of pulses for inverse direction. The throw-away means 6 throws away all signal charges. The throw-away means comprises, for example, an FET and an electric source.

Then, the signal charges charged at the photoelectric conversion device 1 in the period 13 after the first charge pulse 11 are transferred to the vertical transferring means 2 by a second charge pulse 12. Until the next charge pulse 11 after the second charge pulse 12, namely, in the vertical scanning period, signal charges for 1 horizontal line are sequentially transferred to the horizontal transferring means 3 from the vertical transferring means 2 by the vertical transferring pulse in every 1 horizontal period as in the conventional case not using the electronic shutter. Then, the signal charges are transferred to the signal detecting means 4 by the horizontal transferring pulses, thereby to be issued. Thus, the unnecessary signal charges are not issued in the period 19 of FIG. 6(e) from the solid state image sensing device.

As mentioned above, according to the second and third embodiments, a voltage which is thirty times as large as the normal voltage, caused by the unnecessary signal charges, is not produced at the signal detecting means 4. Further, the large voltage is not produced at a beginning part of the vertical transferring period.

Incidentally, the second and third embodiments can be combined. Further, a frame transfer CCD can be used as the solid state image sensing device. Also, the period of the electronic shutter can be freely adjusted by varying the period between the first charge pulse and the second charge pulse.

While specific embodiments of the invention have been illustrated and described herein, it is realized that modifications and changes will occur to those skilled in the art. It is therefore to be understood that the appended claims are intended to cover all modifications and changes as falling within the true spirit and scope of the invention.

What is claimed is:

1. A method for driving a solid state image sensing device, comprising the steps of:
   photoelectrically converting light energy to signal charges of electrical energy using plural photoelectric conversion devices disposed in a matrix pattern, transferring signal charges accumulated in said photoelectric conversion devices to respective plural vertical transferring means disposed beside said photoelectric conversion devices, transferring said signal charges to horizontal transferring means from said plural vertical transferring means, transferring said signal charges from said horizontal transferring means to signal detecting means, detecting said signal charges transferred from said horizontal transferring means and issuing video signals by said signal detecting means, transferring unnecessary signal charges among said signal charges to said vertical transferring means based on reception of a first charge pulse in a vertical blanking period, transferring said unnecessary signal charges to throw-away means disposed at a side opposite to said horizontal transferring means with regard to said vertical transferring means, from said vertical transferring means, throwing away said unnecessary signal charges by said throw-away means, and transferring, based on a second charge pulse, necessary signal charges which are accumulated in said photoelectric conversion devices in such period between said first charge pulse and said second charge pulse to said vertical transferring means, and further transferring said necessary signal charges through said vertical transferring means and said horizontal transferring means to said signal means.

2. Method for driving a solid state image sensing device in accordance with claim 1, wherein said signal detecting means detects said signal charges and issues a voltage variation signal based on an amount of said signal charges.

3. Method for driving a solid state image sensing device in accordance with claim 1, wherein said signal detecting means detects said signal charges and issues a current variation signal charge.

4. A method for driving a solid state image sensing device, comprising the steps of:

photoelectrically converting light energy to signal charges of electrical energy using plural photoelectric conversion devices disposed in a matrix pattern, transferring signal charges accumulated in said photoelectric converstion devices to respective plural vertical transferring means disposed beside said photoelectric conversion devices, transferring said signal charges to horizontal transferring means from said plural vertical transferring means, transferring said signal charges from said horizontal transferring means to signal detecting means, detecting said signal charges transferred from said horizontal transferring means and issuing video signals by said signal detecting means, transferring unnecessary signal charges among said signal charges to said vertical transferring means based on reception of a first charge pulse in a vertical blanking period, transferring said unnecessary signal charges to said horizontal transferring means, from said vertical transferring means, transferring said unnecessary signal charges to throw-away means disposed at a side opposite to said signal detecting means with regard to said horizontal transferring means from said horizontal transferring means, throwing away said unnecessary signal charges by said throw-away means, and transferring, based on reception of a second charge pulse, necessary signal charges which are accumulated in said photoelectric conversion devices in such period between said first charge pulse and said second charge pulse to said vertical transferring means, and further transferring said necessary signal charges through said vertical transferring means and said horizontal transferring means to said signal detecting means.

5. Method for driving a solid state image sensing device in accordance with claim 4, wherein said signal detecting means detects said signal charges and issues a voltage variation signal based on an amount of said signal charges.

6. Method for driving a solid state image sensing device in accordance with claim 4, wherein said signal detecting means detects said signal charges and issues a current variation signal charge.

7. A method for driving a solid state image sensing device, comprising the steps of:

photoelectrically converting light energy to signal charges of electrical energy using plural photoelectric conversion devices disposed in a matrix pattern, transferring signal charges accumulated in said photoelectric conversion devices to respective plural vertical transferring means disposed beside said photoelectric conversion devices, transferring said signal charges to horizontal transferring means from said plural vertical transferring means, transferring said signal charges in said horizontal transferring means to signal detecting means from said horizontal transferring means, detecting said signal charges transferred from said horizontal transferring means and issuing video signals by said signal detecting means, transferring unnecessary signal charges among said signal charges to said vertical transferring means based on reception of a first charge pulse in a vertical blanking period, transferring, based on reception of a second charge pulse, necessary signal charges which are accumulated in said photoelectric conversion devices in such period between said first charge pulse and said second charge pulse to said vertical transferring means, and throwing away said unnecessary signal charges by transferring said signal charges to throw-away means from said vertical transferring means before said necessary signal charges are transferred to said vertical transferring means.

8. Method for driving a solid state image sensing device in accordance with claim 7, wherein said period between said first charge pulse and said second charge pulse is variable.

* * * * *